United States Patent
Haven

(10) Patent No.: US 6,637,888 B1
(45) Date of Patent: Oct. 28, 2003

(54) FULL COLOR REAR SCREEN PROJECTION SYSTEM USING A SINGLE MONOCHROME TFT LCD PANEL

(75) Inventor: Thomas J. Haven, Portland, OR (US)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 10/057,132

(22) Filed: Jan. 24, 2002

(51) Int. Cl.$^7$ .............................................. G03B 21/14
(52) U.S. Cl. .......................................... 353/31; 353/94
(58) Field of Search ............................. 353/20, 31, 34, 353/37, 94, 101; 349/5, 7, 8; 359/487, 494, 495, 497, 500; 348/771

(56) References Cited

U.S. PATENT DOCUMENTS

| | | | |
|---|---|---|---|
| 4,864,390 A | 9/1989 | McKechnie et al. | 358/60 |
| 5,012,274 A | 4/1991 | Dolgoff | 340/702 |
| 5,161,042 A | 11/1992 | Hamada | 359/41 |
| 5,185,712 A * | 2/1993 | Sato et al. | 348/333.08 |
| 5,241,407 A | 8/1993 | Sonehara et al. | 359/40 |
| 5,608,467 A | 3/1997 | Janssen et al. | 348/744 |
| 5,767,924 A * | 6/1998 | Hiroki et al. | 349/5 |
| 5,786,934 A | 7/1998 | Chiu et al. | 359/494 |
| 5,805,244 A | 9/1998 | Suh | 349/7 |
| 5,845,981 A * | 12/1998 | Bradley | 353/31 |
| 5,865,521 A * | 2/1999 | Hashizume et al. | 353/38 |
| 5,880,889 A | 3/1999 | Neumann et al. | 359/634 |
| 5,897,190 A * | 4/1999 | Takahashi | 353/31 |
| 5,900,982 A | 5/1999 | Dolgoff et al. | 359/619 |
| 6,053,615 A * | 4/2000 | Peterson et al. | 353/20 |
| 6,097,546 A | 8/2000 | Yoshii et al. | 359/649 |
| 6,137,547 A | 10/2000 | Iijima et al. | 348/789 |
| 6,276,802 B1 | 8/2001 | Naito | 353/74 |
| 6,334,685 B1 * | 1/2002 | Slobodin | 353/31 |
| 6,457,833 B1 * | 10/2002 | Ishikawa et al. | 353/99 |
| 2002/0051112 A1 | 5/2002 | Katsura | 349/153 |

OTHER PUBLICATIONS

"Single–Panel Liquid Crystal Optical Engine for Rear Projectors", Sony publication DS002AKA, 10,1997, 16 pages.
"High Luminance, High Image Quality, and High Resolution Achieved in Single–Panel LCD Panels Single–Panel Color Projection TV LCDs, LCX011AM, LCX019AM", 2 pages.
J. Fuhrmann, et al., "28:2: Enhancement of the Light Efficiency of LC Projection Systems by the Use of Dichroic Color Filters," (1997) SID Digest, pp. 761–764.
H. Kanayama, et al., 15.1: A New LC Rear–Projection Display Based on the "Color–Grating Method," (1998) SID Digest, pp. 199–202.
E. Stupp, et al., Book Name: "Emissive Projection Systems," (1998) John Wiloyx Son, Ltd., pp. 201–207.

* cited by examiner

*Primary Examiner*—William Dowling
(74) *Attorney, Agent, or Firm*—Patent Law Group LLP; Carmen C. Cook

(57) ABSTRACT

A rear screen projection system uses a single monochrome liquid crystal display (LCD) panel for displaying full color images. In one embodiment, an apparatus for projecting an image includes an illumination source generating polarized light beams in three different primary colors, a monochrome liquid crystal display panel including a two-dimensional array of addressable pixels, the array of addressable pixels is divided into multiple image areas, and a projection lens assembly for aligning and projecting the images generated by the multiple image areas of the liquid crystal display panel to form a full color image. In one embodiment, the illumination source includes a light source emitting randomly polarized white light, a polarizing element coupled to receive the randomly polarized white light and generate a polarized white light beam, and color separating elements for separating the polarized white light beam into the polarized light beams in three different primary colors.

37 Claims, 5 Drawing Sheets

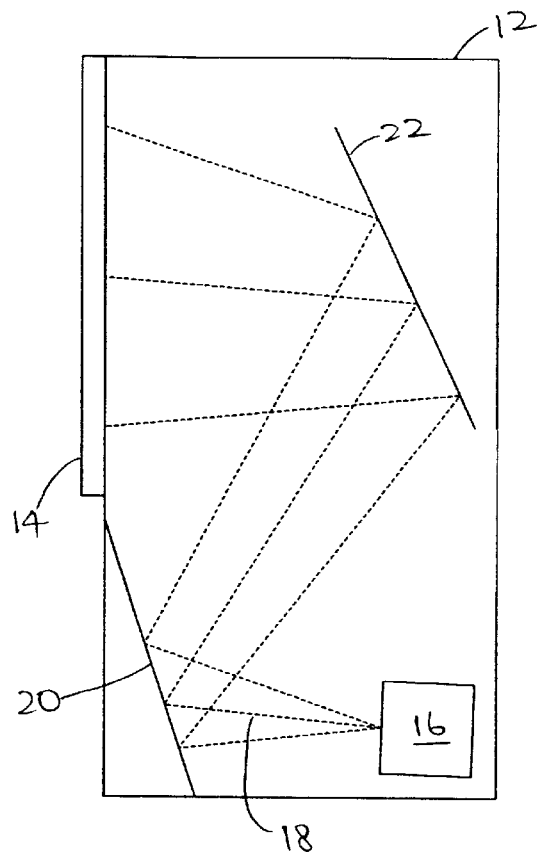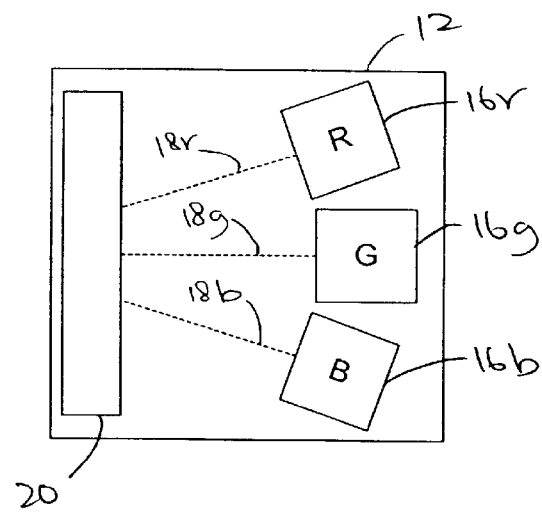
Fig. 1A
Fig. 1B

FULL COLOR REAR SCREEN PROJECTION SYSTEM USING A SINGLE MONOCHROME TFT LCD PANEL

BACKGROUND OF THE INVENTION

1. Field Of The Invention

The invention relates to video/data projection systems, and more particularly to a full color video/data projection system employing a single monochrome thin film transistor liquid crystal panel.

2. Description of the Related Art

The predominant consumer rear screen projection systems in use today for diagonal screen sizes of more than 40 inches are commonly known as cathode ray tube, or CRT projection televisions. Such systems utilize three projection CRTs, one for each primary color, red, green and blue to produce a full color image.

FIG. 1A is a side view of a conventional rear screen projection display using 3 CRT's. The system is contained in a display cabinet 12 with a viewing screen 14. Viewing screen 14 may be, for example, 60 inches measured diagonally. An image 18 is formed by a CRT 16 in the lower portion of display cabinet 12. The CRT projection lens (located just in front of the CRT faceplate) reforms the image at viewing screen 14 by reflecting the CRT light from mirrors 20 and 22. Viewing screen 14 is made of an appropriate material such that a viewer may see an image from the front side of the viewing screen 14, when the screen is illuminated from the backside.

FIG. 1B is a top view of the lower portion of the rear screen projection system within display cabinet 12 containing the three CRTs. The three CRT/projection lens assemblies 16r, 16g, and 16b are positioned so their respective images 18r, 18g, and 18b will overlap as they strike the viewing screen.

The size and weight of the three CRT's make the projection system rather large and heavy. In addition, for systems where the diagonal of the viewing screen is on the order of 50 to 70 inches, the brightness requirement for the CRT's becomes very large. The brightness requirement in turn limits the resolution of the projection system to the extent that many CRT systems have difficulty supporting resolutions greater than the resolution standard imposed by the National Television Standards Committee (NTSC).

Therefore, for high definition television (HDTV) resolutions, such as 1280 by 1080 pixels interlaced (1080i) or 720 pixels progressive (720p), projection systems are turning to digital light processing (DLP) and liquid crystal display (LCD) technologies. A rear screen projection system utilizing LCD or DLP technology is configured similar to the CRT arrangement shown in FIGS. 1A and 1B, in that a lamp and the image forming device(s) are situated in the lower portion of the display cabinet with mirrors and projection lenses arranged to magnify the image from the image forming device to the viewing screen.

DLP technology utilizes an image forming reflective chip (a DLP chip) with microelectromechanical mirrors constructed thereon. Light is directed onto the DLP chip and the DLP chip selectively modulates the light reflected from the chip by tilting the micro-mirrors. The reflected light passes through a projection lens assembly to form a display image. To produce a full color image, a DLP projector uses a spinning color wheel at the light source operated in accordance with the conventional frame sequential color method.

The DLP rear screen projection system has several disadvantages. First, the DLP chip is an expensive component and, in an effort to minimize the cost, the chip is generally manufactured in small dimensions, for example, a diagonal of 0.7 inches. The small chip dimension in turn requires complicated and costly projection lenses because of the large magnification required, from less than one inch up to 40 to 70 inch diagonal screens, and because of the short throw distance available, typically around 3 feet, within the television display cabinet. Also, the small chip dimension requires a very short arc in order to efficiently utilize the lamp light. Very short arc lamps have short lamp life and replacement cost is high. Additionally, moving parts necessary for controlling the spinning color wheel present reliability problems and system noise.

LCD projectors can use either transmissive or reflective liquid crystal display panels as the image forming elements. Reflective LCD panels are fabricated on silicon substrates and therefore, in order to control costs, have similar dimensions to DLP chips, typically less than one inch diagonal. The reflective Liquid Crystal on Silicon (LCOS) panels used in rear screen projection systems typically employ a frame sequential method for producing a full color image. Therefore, LCOS system have all the same disadvantages of DLP systems.

LCD projectors using transmissive liquid crystal display panels as the image-forming element typically use panels fabricated on a quartz polysilicon substrate. Again, to control costs, these panels usually have a diagonal dimension of less than 1.3 inches. In an LCD projector, polarized light is transmitted through an LCD panel, typically a thin film transistor (TFT) LCD panel. The LCD panel modulates the polarization of the light according to the desired image data. The modulated light then passes through another polarizer, or an analyzer, to form the desired image. The image is magnified and reformed for display on a viewing screen.

The polysilicon LCD rear screen projection systems can use one to three small LCD panels. Generally, for full color display, the three panel configuration is used, one panel for each primary color channel. The three panel configuration is preferred because the light efficiency of the LCD panels is not as high as DLP and because the LCD panels generally available cannot modulate the light as fast as a DLP device. A further disadvantage of using three LCD panels is that they require complex assembly techniques to optically align the LCD's such that the different colored pixels of each panel are precisely aligned in the final image. Ensuring such alignment over time presents a further complexity for the system. Again, the projection lens of an LCD rear screen projector further requires a large magnification within a short throw distance and therefore increases the cost and complexity of the system.

Single panel LCD rear screen projection systems have been used for projection screens of 40 to 60 inches measured diagonally. The LCD panels used in these systems typically range from 6 to 18 inches in diagonal. Each full color pixel within the panel is divided into separate sub-pixels that are dyed or colored red, green, and blue. This method of producing full color has the disadvantage of severely reducing the transmission of the panel because of the properties of the dye material and the loss of spatial resolution. The combined effect of these two factors reduces the percentage of light transmitted through a panel to between 4 and 6 percent, approximately one-sixth the amount of an equivalent panel without dye material. In an attempt to increase the transmission and thus the brightness of the image produced, the colors are de-saturated, i.e., the red dye is made lighter or less vivid in order to transmit more light. Color de-saturation, as expected, affects the quality of the image projected. Therefore, the single panel LCD rear screen projection system suffers from both low system brightness and poor color quality absent additional lamps and optics.

It is therefore desirable to provide a rear screen projection system with high resolution and brightness without complicated and expensive lens assemblies. Thus, a rear screen projection system capable of generating an efficient high quality full color display image with reduced manufacturing and component costs is desired.

SUMMARY

According to one embodiment of the present invention, an apparatus for projecting an image includes an illumination source generating polarized light beams in three different primary colors and a monochrome liquid crystal display panel including a two-dimensional array of addressable pixels. The array of addressable pixels is divided into multiple image areas, each image area receiving one of the polarized light beams in a respective primary color and modulating the polarized light beam to generate an image in the respective primary color. The apparatus further includes a projection lens assembly for aligning and projecting the images generated by the multiple image areas of the liquid crystal display panel to form a full color image.

In one embodiment, the illumination source includes a light source emitting randomly polarized white light, a polarizing element coupled to receive the randomly polarized white light and generate a polarized white light beam, and color separating elements for separating the polarized white light beam into polarized light beams in three different primary colors.

The present invention is better understood upon consideration of the detailed description below and the accompanying drawings.

BRIEF DESCRIPTION OF THE DRAWINGS

In the present disclosure, like objects which appear in more than one figure are provided with like reference numerals.

DETAILED DESCRIPTION

In accordance with the principles of the present invention, a full color rear screen projection system includes a single monochrome thin film transistor (TFT) LCD panel divided into three image areas of addressable pixels where each image area receives and modulates light in one of three primary colors. Each image area of the TFT panel modulates a respective primary color of light according to image data for creating the corresponding color component of a full color image. The color images in the primary color components generated by the separate image areas of the TFT panel are then overlaid optically to form a full color image on a viewing screen.

The full color rear screen projection system of the present invention operates to provide an efficient and high quality full color image using a single monochrome TFT panel. By using a single LCD panel for displaying a full color image, as opposed to using three separate LCD panels, the projection system of the present invention eliminates the burdensome task of aligning multiple panels in the projection system. Furthermore, the projection system of the present invention uses a monochrome LCD panel, thereby increasing the light throughput and improving the brightness of the display image. The light throughput and brightness improvement in the projection system of the present invention is significant over the conventional projection system using color LCD panels. As described above, conventional single panel LCD projectors use a color LCD panel where each pixel location is subdivided and overlaid with one of three color filters formed by color dyes. The percent transmission through the color LCD panel is inherently very low (4–6%). The low transmission is due to the light absorbing properties of the color dye material and the need to divide the pixels into separate colored subpixels. In accordance with the present invention, a monochrome TFT LCD panel, without any color filters overlaying the pixels, is used for full color display such that the light transmission rate can be significantly increased.

Figure 2:
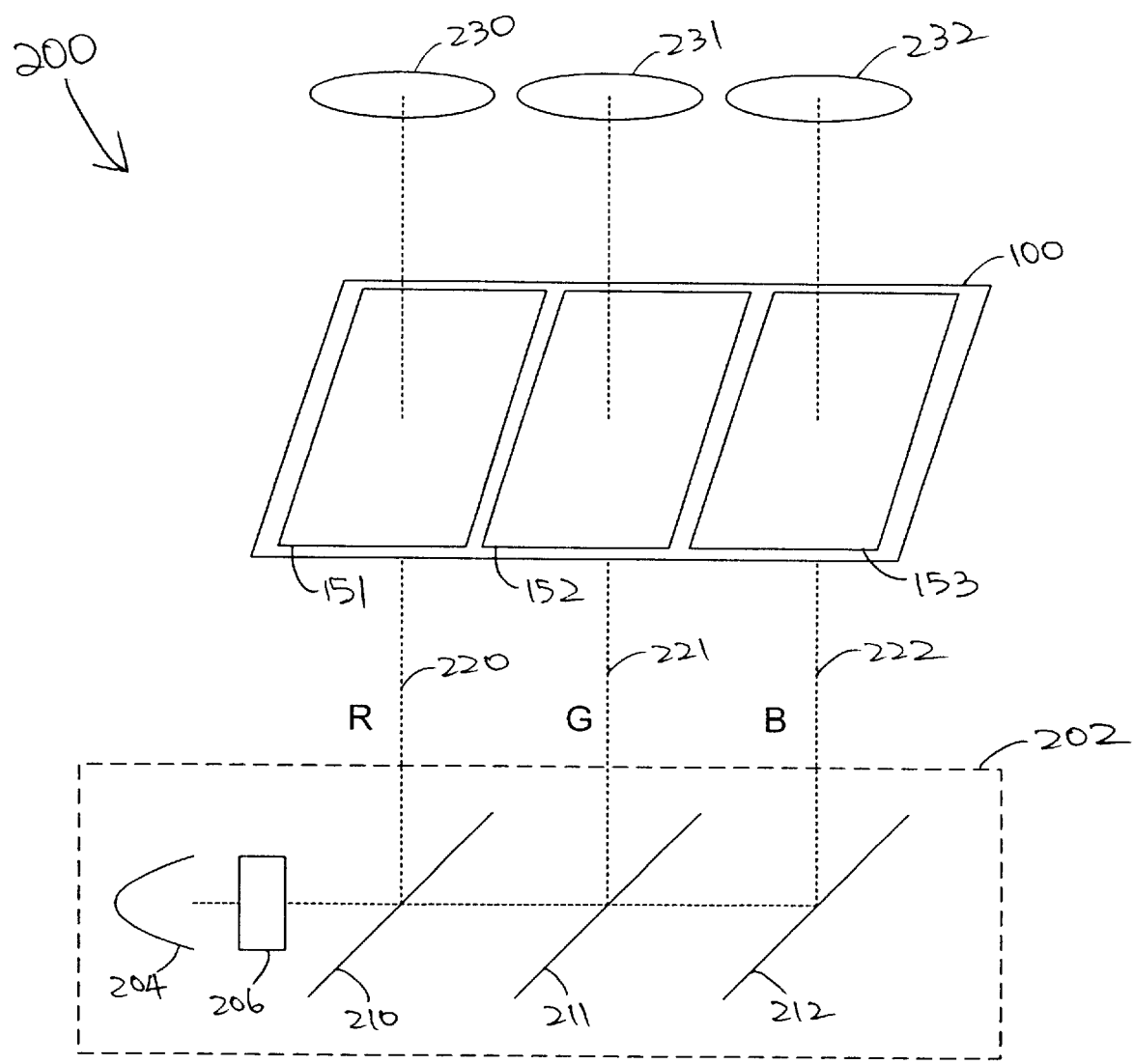
FIG. 2 is a schematic diagram of a full color rear screen projection system according to one embodiment of the present in invention.

FIG. 2 is a schematic drawing of a full color rear screen projection system according to one embodiment of the present invention illustrating the basic components and the basic operation of the projection system. Referring to FIG. 2, full color rear screen projection system 200 includes an illumination source 202 providing a source of polarized color light beams, a monochrome TFT LCD panel 100 and a projection lens assembly including projection lenses 230, 231 and 232.

Illumination source 202 may be configured in one of many ways known in the art to provide polarized and color-filtered light beams. In general, illumination source 202 includes a light source, a polarizing element and a color separating element for separating light into the primary colors. Illumination source 202 operates to generate polarized light beams in the primary colors. For example, in the present embodiment, polarized light beams 220, 221, 222 in the red, green and blue colors, respectively, are generated by illumination source 202. In the present description, the primary color system used is the RGB (red, green, blue) color system which is most commonly used in conventional projection systems.

In the present embodiment, illumination source 202 includes a lamp 204 supplying a source of randomly polarized white light for the projection system. Lamp 204 can be a metal-halide arc lamp with a parabolic reflector, or an elliptical reflector, depending on the configuration of illumination source 202. Illumination source 202 also includes a polarizing element 206 for polarizing the randomly polarized white light emitted by lamp 204. In one embodiment, polarizing element 206 can be configured as a set of lens arrays and a polarizing converting system (PCS) incorporating polarizing beam splitters for collimating and polarizing light from lamp 204. In another embodiment, polarizing element 206 can be figured as a tunnel integrator with a transmitting/reflecting polarizer. Configurations of polarizing element 206 will be described in more detail below with reference to FIG. 3.

Lastly, illumination source 202 includes a red color dichroic mirror 210, a green color dichroic mirror 211 and a mirror 212 as the color separating elements. Polarized light from polarizing element 206 is separated into red, green, and blue light beams by the dichroic mirrors 210, 211. In operation, the first dichroic mirror 210 reflects red light while transmitting green and blue light. Thus, a polarized light beam 220 in the red color is generated and reflected towards TFT panel 100. The second dichroic mirror 211 reflects green light while transmitting the remaining blue light. Thus, a polarized light beam 221 in the green color is generated and reflected towards TFT panel 100. Finally, the remaining blue light is reflected by the third mirror 212 to form polarized light beam 222, and is directed towards TFT panel 100. Mirror 212 can be a folding mirror or any conventional mirrors for reflecting light of any colors. As shown in FIG. 2, the polarized color light beams 220, 221 and 222 are each directed to a respective image area in TFT panel 100, as will be explained in more detail below.

The embodiment of illumination source 202 shown in FIG. 2 is illustrative only and one of ordinary skill in the art would appreciate that many configurations of light source, polarizing element and color separating elements are possible for generating polarized light beams in the primary colors. For example, mirrors 210, 211, and 212 can be placed in different positions depending on the position of TFT panel 100 and the position of lamp 204 within the projection system. Other arrangements for color separating elements are possible, such as the use of color separating prisms, color filters, other dichroic surfaces. While the embodiment of illumination source 202 shown in FIG. 2 achieves efficiency by using a single light source and separating the single light source into the primary color components so that no light is wasted, other embodiments of illumination source 202 may include multiple light sources (lamps) if efficiency and power consumption is not of primary concern. For instance, in another embodiment, illumination source 202 includes three lamps, three polarizing elements and three color filters in the red, green and blue colors. Each lamp/polarizing element/color filter group generates a polarized light beam in one primary color directed at the respective image area of TFT panel 100.

In the present embodiment, monochrome TFT LCD panel (TFT panel) 100 is an active matrix monochrome TFT panel. TFT panel 100 includes liquid crystal material and electrodes sandwiched between transparent glass plates. TFT panel 100 also includes an input polarizer and an output polarizer. TFT panel 100 is controlled by electronics (not shown) that control the electrodes on the panel, each electrode forming a pixel of TFT panel 100. The electrodes operate to apply voltages to the liquid crystal molecules in accordance with the image data provided by the control electronics. The liquid crystal molecules in turn modulate the incoming polarized light beams in accordance with the image data.

TFT panel 100 is a two dimensional array of individually addressable pixels that define the resolution of the panel. The resolution of TFT panel 100 is selected based on the application of the projection system. In accordance with one embodiment of the present invention, TFT panel 100 is provided by converting a commercially available full color TFT LCD panel into a monochrome panel. For example, a monochrome panel can be formed by omitting the color dye in the manufacturing process of the full color panel. The resolution of a full color TFT LCD panel is defined by the number of "color pixels" in the panel. For example, a full color TFT panel can have a Super Enhanced Graphics Array (SXGA) resolution of 1280 by 1024 color pixels. A TFT panel having 1280 by 1024 resolution will include approximately 1.3 million color pixels. In the present description, a color pixel refers to a group of subpixels in the LCD panel whereby each sub-pixel in the group of pixels is disposed to transmit light in one of the primary colors and the group of sub-pixels together generates a light output indicative of the color specified by the image data for the color pixel. Thus, in a full color TFT panel of 1280 by 1024 resolution and a color pixel including three sub-pixels in the RGB color space, the TFT panel will have about 1.3 million times 3, or 3.9 million, individually addressable pixels. In the present embodiment, TFT panel 100 is adapted from a full color TFT panel with SXGA resolution. Thus, TFT panel 100 can have approximately 4 million individually addressable pixels depending on the configuration of the color pixels. The various configurations of the color pixels in a full color TFT panel will be described in more detail below.

In the present embodiment of the invention, the two dimensional array of addressable pixels of TFT panel 100 are divided into three separate image areas 151, 152, and 153. Each image area of TFT panel 100 receives image data information for creating an image in the primary color component designated for that image area. For example, image area 151 is designated to create an image in the red color component, image area 152 is designated to create an image in the green color component, and image area 153 is designated to create an image in the blue color component. In accordance with the present invention, the separate images representing the primary color components of a color image are created by transmitting colored light through separate image areas of a monochrome LCD panel. Each image area receives image data information associated with the primary color component designated for that image area. The image data information can be provided via the control electronics of TFT panel 100. Each image area modulates the polarized color light designated for that image area to create the desired image in the primary color component.

Referring to FIG. 2, polarized light beams 220, 221 and 222 in red, green and blue colors are directed to their respective image areas 151, 152 and 153 of TFT panel 100. Red image area 151 of TFT panel 100 modulates incident red light beam 220 according to red image data to form the red portion of the full color image. Similarly, green area 152 and blue area 153 of TFT panel 100 modulate green light beam 221 and blue light beam 222 according to the green and blue image data respectively.

After TFT panel 100 modulates light beams 220, 221, and 222, the modulated light beams exiting TFT panel 100 are directed towards a projection lens assembly including projection lenses 230, 231 and 232. The modulated light beams must be aligned so that the separate images will overlay to form one composite full color image at the viewing screen. The modulated light beams exiting TFT panel 100 are offset from each other because the three image areas 151, 152, 153 are coplanar on TFT panel 100 and polarized light beams 220, 221, and 222 are approximately parallel to each other as they pass through TFT panel 100. Therefore, the three images in the primary color components formed by the modulated light beams have to be aligned so that the images will overlay precisely on the viewing screen to form a single full color image.

In one embodiment, the three images in the primary color components are overlaid by offsetting the position of projection lenses 230, 231 and 232. Specifically, outer lenses 230 and 232 are placed in an offset position with respect to the middle lens 231 using Keystone correction techniques. Keystone correction techniques are well known and have been applied in front projection systems whereby two or more projectors displaying the same images are overlaid to increase the image brightness. The images are overlaid by offsetting one of the projector's projection lenses relative to the second projector. When Keystone correction techniques are applied to the projection lenses of projection system 200, projection lens 231 is positioned on-axis while projection lenses 230 and 232 are positioned off-axis. The amount of offset for the projection lens is given by the separation distance of the corresponding LCD image pixels in each of the color images divided by the system magnification. For example, if the center pixel in the green image (modulated light beam 221) is separated from the center pixel in the blue image (modulated light beam 222) by 70 mm and the system magnification is 7, then the projection lens offset for projection lens 232 is approximately 10 mm towards projection lens 231. In this manner, the three images generated by the three image areas in TFT panel 100 will overlay precisely to create a single full color image.

As described above, TFT panel 100 of projection system 200 may be manufactured by converting commercially available full color TFT panels into monochrome TFT panels. Thus, the manufacturing cost of projection system 200 can be greatly reduced because commercially available TFT panel can be manufactured at low cost due to economies of scale. The manufacturing cost of projection system 200 can be further reduced through the use of inexpensive and less complicated projection lenses, at least as compared to DLP, LCOS and polysilicon projection systems. Commercially available TFT panels are larger in size than a DLP chip. For example, TFT panel 100 of projection system 200 can have a dimension of 7 to 21 inches, measured diagonally. On the other hand, a DLP chip is typically only 0.7 inches. Because the image forming element, the TFT panel, in projection system 200 is larger, a relatively small magnification (e.g., less than 10) is needed to project the image for display. On the contrary, a DLP projection system typically requires a magnification of 50 to 100 times or greater because the image forming element is very small. The lower magnification requirement in the projection system of the present invention allows for the use of less expensive and less complicated optics to both project and overlay the color images on the viewing screen. For example, projection lenses commonly used in CRT projectors consist of 3 or 4 elements and are made of plastic for low cost. This type of lens may be employed in the projection system of the present invention. By comparison, the high magnification lenses required for DLP projectors consist of 13 to 16 elements with several elements necessarily made of exotic high index glasses.

Referring to FIG. 2, the projection lens assembly is shown as including three projection lenses only (lenses 230, 231, 232). The projection lens assembly in FIG. 2 is illustrative only and in actual implementation, the projection lens assembly may include more or fewer lenses for magnifying and focusing the modulated light beams to form a full color display image.

Figure 3:
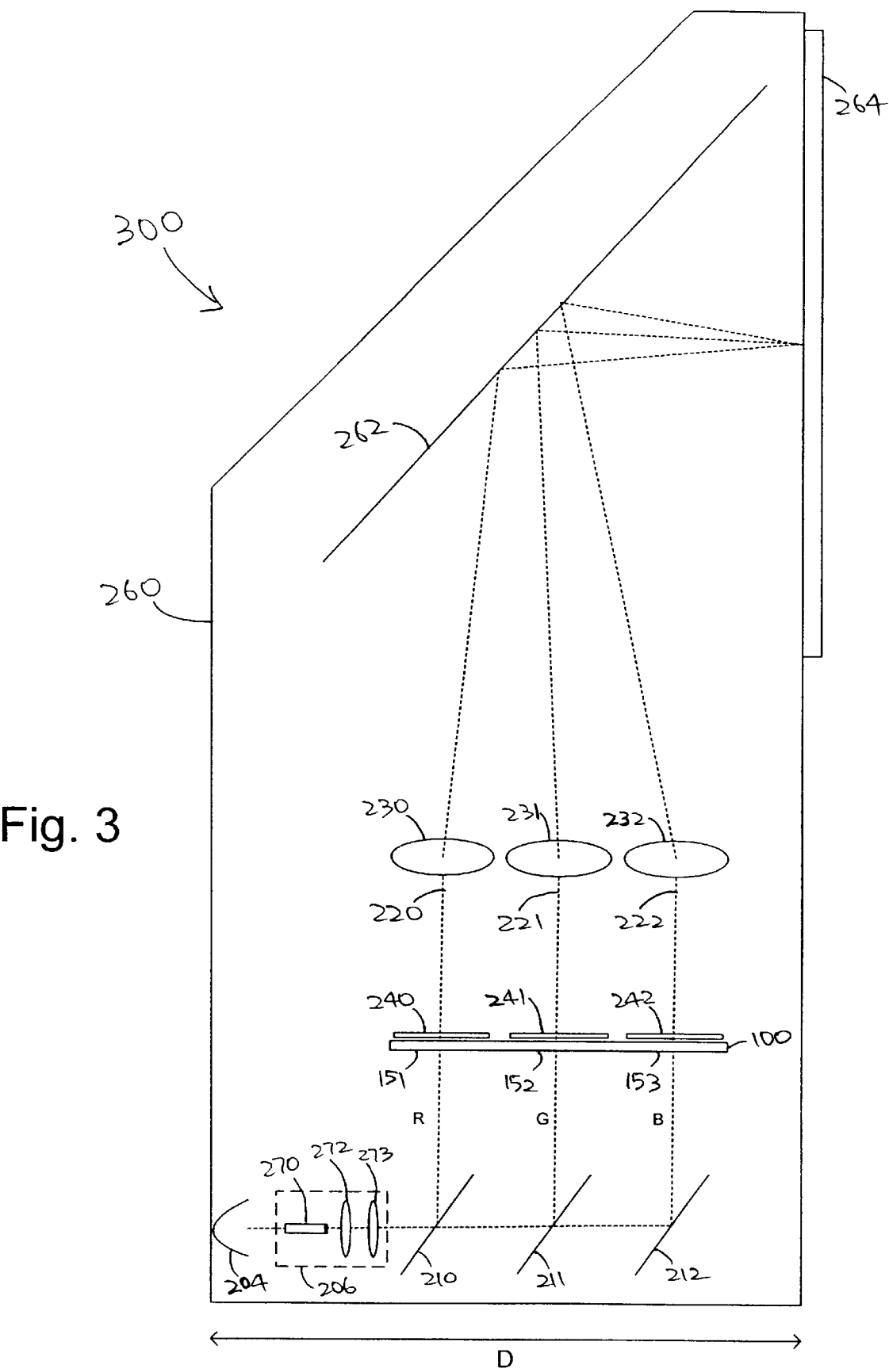
FIG. 3 is a side view of a full color rear projection system using a single monochrome TFT panel according to one embodiment of the present invention.

FIG. 3 is a side view of a full color rear projection system using a single monochrome TFT panel according to one embodiment of the present invention. Like elements in FIGS. 2 and 3 are given like reference numerals. Referring to FIG. 3, rear projection system 300 includes a display cabinet 260 that houses the image forming components of the projection system. Display cabinet 260 includes a viewing screen 264 placed on one side for displaying the image projected thereon. Display cabinet 260 can vary in size and shape but is generally constructed as small as possible to house the image forming components and viewing screen 264.

Projection system 300 includes lamp 204 emitting a source of randomly polarized white light. In the present embodiment, polarizing element 206 in projection system 300 includes a tunnel integrator and a transmitting/reflecting polarizer 270 for generating a source of polarized light. A condenser lens assembly, including lenses 272 and 273, may be included for collimating the polarized light and directing the light onto a desired light path. A polarizing system using a tunnel integrator and a transmitting/reflecting (T/R) polarizer for generating polarized light is described in copending and commonly assigned U.S. patent application Ser. No. 10/014,029, entitled "Polarization Recapture System for Liquid Crystal-Based Data Projectors," by Thomas J. Haven and Kurt R. Munson, filed on Dec. 7, 2001, which patent application is incorporated herein by reference in its entirety. In brief, the tunnel integrator has an input end and an output end where the input end includes an input aperture and a reflective inside surface coated with a quarter wave retarder. The transmitting/reflecting polarizer is coupled to the output end of the tunnel integrator. In operation, the randomly polarized light from the light source arrives at the input end of the tunnel integrator and enters the tunnel integrator through the input aperture. The T/R polarizer transmits light having a first polarization as polarized light output and reflects light having a second polarization orthogonal to the first polarization. The reflected light is reoriented by the mirror and quarter-wave plate in the tunnel integrator so that it can now be transmitted through T/R polarizer. In one embodiment, the transmitting/reflecting polarizer is a wire grid polarizer.

In the present embodiment, projection system 300 includes dichroic mirrors as color separating elements. As described above in reference to FIG. 2, polarized light from polarizing element 206 is directed at the first dichroic mirror 210. Dichroic mirror 210 reflects red polarized light towards red image area 151 of TFT panel 100, and transmits green and blue light to the second dichroic mirror 211. Dichroic mirror 211 reflects green polarized light towards green image area 152 of TFT panel 100 and transmits the remaining blue light to the third mirror 212. Finally, mirror 212 reflects the remaining blue polarized light towards blue image area 153 of TFT panel 100. As mentioned above, different arrangements of mirrors and lamps may be used to optimize the size and efficiency of the system.

In the present embodiment, Fresnel lenses 240, 241, and 242 are positioned above TFT panel 100 and are each in alignment with respective image areas 151, 152 and 153 on the TFT panel. In one embodiment, Fresnel lenses 240, 241 and 242 are positioned 15 mm away from the output polarizer of TFT panel 100. The Fresnel lenses 240, 241 and 242 operate to steer the modulated light beams 220, 221 and 222 emerging from each color image area 151, 152 and 153 to the offset positions of projection lenses 230, 231 and 232. The use of Fresnel lenses allows for the use of smaller projection lenses and helps diminish interference between the three modulated color light beams.

The three color light beams 220, 221, and 222 are directed by projection lenses 230, 231 and 232 to a mirror 262 where the light beams are reflected and directed towards viewing screen 264. By offsetting the position of projection lenses 230 and 232 using Keystone correction techniques, the three separate color images will overlay to form a composite full color image on the viewing screen.

Rear projection system 300 can be made more compact and lightweight than conventional CRT rear projection systems. The smaller magnification requirement means that a shorter throw distance is needed to project the display image from the TFT panel to viewing screen 264. The depth "D" of display cabinet 260 can thus be made smaller than in conventional systems. The smaller magnification requirement also means that fewer projection lens elements are required, reducing the weight of projection system 260. And, of course, the single monochrome TFT panel eliminates the weight associated with using three CRT/yoke assemblies.

In the present description, polarizing element 206 in projection system 300 is implemented using a tunnel integrator and a transmitting/reflecting polarizer. In other embodiments, other types of polarizing elements can also be used in the rear projection system of the present invention. In an alternate embodiment, a full color rear projection system of the present invention includes a polarizing element implemented as a set of lens arrays and a polarizing converting system (PCS) plate. The PCS plate includes a column of polarizing beam splitter (PBS) elements for converting randomly polarized light from the illumination source to a single polarization. The polarized light is typically directed by a condenser lens that overlays the polarized light images at a specific location. The operation of lens arrays and PCS plate is well known in the art and a description is provided in the aforementioned patent application.

Referring to FIG. 3, Fresnel lenses 240, 241 and 242 are illustrated as separate lenses from projection lenses 230, 232 and 232. In another embodiment, a composite Fresnel lens/projection lens assembly can be used where the Fresnel lens is coupled to the projection lens. One lens assembly is then used for each modulated light beam from TFT panel 100. Other Fresnel lens and projection lens assembly can also be used.

As described above, the full color rear screen projection system of the present invention uses a monochrome TFT LCD panel (TFT panel 100) as the image forming element. Full color TFT panels are widely available and are manufactured in many different sizes, resolutions, and pixel configurations. In one embodiment, a monochrome TFT panel is obtained by converting a commercially available full color TFT LCD panel into a monochrome mode, such as by omitting the color dye in the manufacturing process of the full color panel.

Figure 4A:
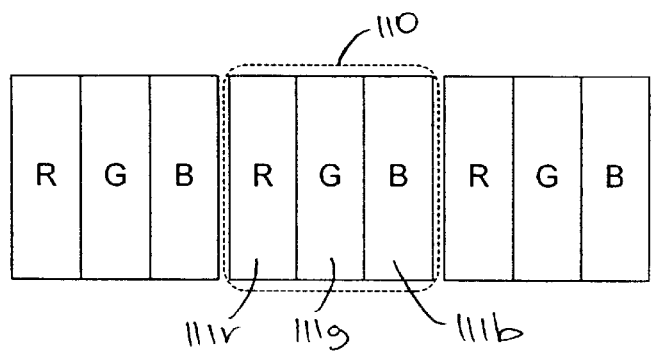
FIG. 4A illustrates a color stripe color pixel configuration commonly used in full color TFT panels.
Figure 4B:
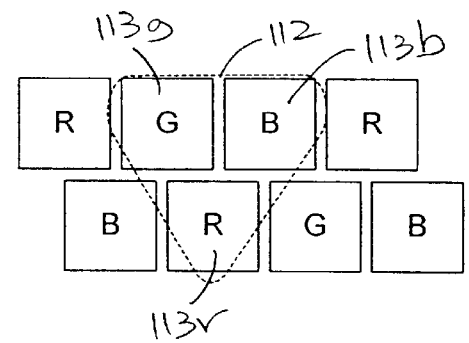
FIG. 4B illustrates a delta color pixel configuration commonly used in full color TFT panels.
Figure 4C:
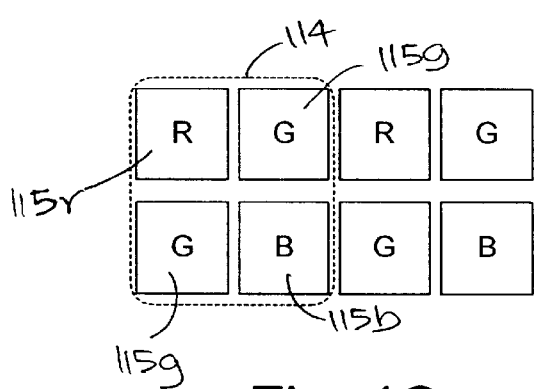
FIG. 4C illustrates a quad color pixel configuration commonly used in full color TFT panels.

Commercially available full color TFT LCD panels may use one of several color pixel configurations. FIGS. 4A–4C illustrate three color pixel configurations that have been commonly used in full color TFT panels. The color pixel configuration shown in FIGS. 4A–4C are provided as exemplary embodiments of the pixel configuration which can be adapted for use in the monochrome TFT panel of the projection system of the present invention. Of course, the projection system of the present invention can be implemented using a monochrome TFT panel having any type of pixel configuration, as long as the pixels are individually addressable so that the TFT panel can be configured into separate image areas as described above. Additionally, if the sub-pixels are square, a net increase in panel resolution can be obtained, as will be further explained below.

The most common configuration of pixels for a full color TFT panel is the color stripe configuration shown in FIG. 4A. Referring to FIG. 4A, a color pixel 110 in the color stripe configuration includes a group of three adjacent pixels, each pixel disposed to display light of one primary color component. For instance, color pixel 110 may include a pixel 111r overlaid with a red color filter, a pixel 111g overlaid with a green color filter and a pixel 111b overlaid with a blue color filter. Pixels arranged in the RGB components of primary color will be referred to here as RGB pixels. Pixels 111r, 111g and 111b, therefore, form a group of RGB pixels. The RGB color filter arrangement extends through the entire area of the TFT panel so that the TFT panel can be viewed as including stripes of RGB color filters, hence the color stripe configuration. The RGB color filters can be implemented in one of many conventional ways, such as by using color dye. Device electronics (not shown) are provided to individually address each of the pixels 111r, 111g, and 111b to modulate the light passing through each pixel so that the combined light forms the desired color for color pixel 110. For example, if color pixel 110 is desired to display a red color, the control electronics will cause light to pass through red pixel 111r but not blue pixel 111b or green pixel 111g. By addressing each of the RGB pixels in each of the color pixels on the TFT panel, a desired full color image can be created.

FIG. 4B shows another configuration of a color pixel, known generally as the delta configuration, in a full color TFT panel. In the delta configuration, a color pixel 112 is formed by a group of RGB pixels 113r, 113g and 113b arranged in a triangular shape. A neighboring group of RGB pixels is arranged as an inverted triangle so that the color pixels can be densely packed in the TFT panel. The RGB pixels in color pixel 112 are individually addressable by control electronics to output the desired color.

FIG. 4C illustrates yet another color pixel configuration, known generally as the quad configuration, used in full color TFT panels. In the quad configuration, a color pixel 114 includes four RGB pixels: a red pixel 115r, two green pixels 115g, and a blue pixel 115b. The four RGB pixels form a square which are duplicated throughout the TFT panel. As with the color stripe and delta configurations, each pixel 115r, 115g, and 115b in color pixel 114 is individually addressable for displaying the desired color.

Figure 5:
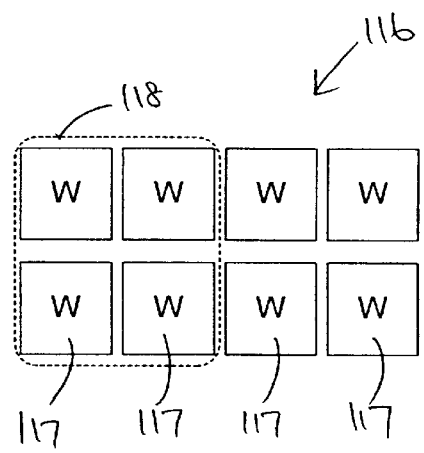
FIG. 5 illustrates the pixel configuration of a monochrome TFT panel that is converted from a full color TFT panel in a quad color pixel configuration.

The monochrome TFT panel used in the rear projection system of the present invention can be made using a full color TFT panel having any color pixel configuration, including the color pixel configurations shown in FIGS. 4A to 4C. FIG. 5 illustrates the pixel configuration of a monochrome TFT panel that is converted from a full color TFT panel in a quad color pixel configuration. In FIG. 5, a monochrome TFT panel 116 is made up of a two-dimensional array of monochrome pixels 117. A group 118 of four monochrome pixels 117 forms what would have been a color pixel in the quad configuration. However, in monochrome TFT panel 116, each pixel 117 is individually addressable and the neighboring pixels are not grouped for the purpose of displaying color. If a full color TFT panel in the quad configuration has a full color resolution of 1280 by 1024 pixels, the same TFT panel converted to monochrome mode will have four times the resolution, or four times the number of individually addressable pixels, that is 2560 by 2048 pixels. The individually addressable monochrome pixels can be divided in separate image areas and advantageously applied for displaying a full color image in accordance with the present invention.

It should be understood that a monochrome panel can also be adapted from other color pixel configurations, such as the color stripe and delta. However, in the color stripe and-delta configurations, the resultant number of individually addressable monochrome pixels is not as high as that of the quad configuration. For example, a monochrome TFT panel converted from a 1280 by 1024 full color TFT panel in the delta configuration would realize a 2 times increase in resolution in height but only 1.5 times increase in resolution in width. A monochrome TFT panel converted from a 1280 by 1024 full color TFT panel in the color stripe configuration could realize a 3 times increase in resolution in width but no increase in resolution in height. However, because of the requirement for square pixels in the monochrome panel, the 3 times resolution increase in the color stripe panel cannot be utilized. That is, because the pixel pitch (or repeat distance) must be equal in both the x and y directions, the color strip configuration does not offer any increase in resolution at all. Therefore, the quad configuration offers the greatest monochrome resolution and is thus preferred.

It should further be understood of course, that a photo mask in the production process defines the dimensions and number of addressable pixels and therefore many different configurations of addressable pixels are possible in a monochrome TFT panel. A monochrome TFT panel based on a 1280 by 1024 full color TFT panel with quad configuration is used in the above discussion because 1280 by 1024 full color TFT panels are currently manufactured and an existing TFT mask set can be readily converted for use in the monochrome TFT panel of the present embodiment. However, one skilled in the art would appreciate that other resolutions and configurations of a monochrome TFT panel may be used in the rear projection system of the present invention. When the monochrome TFT panels are manufactured in large volume, a specific mask set can be made for the specific monochrome TFT panels.

Figure 6:
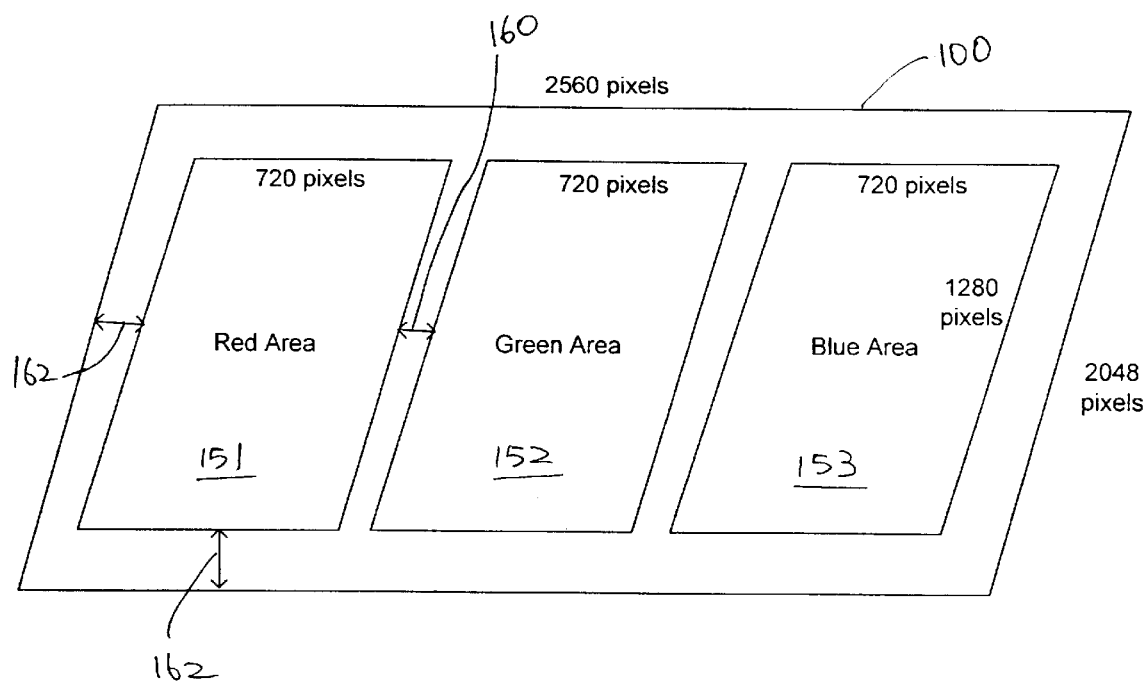
FIG. 6 shows an arrangement of three designated color image areas on a monochrome TFT panel in accordance to one embodiment of the present invention.
Figure 1A:
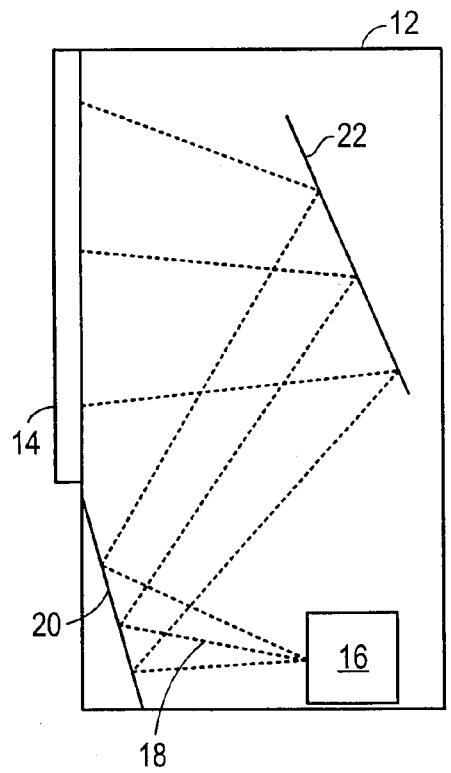
FIG. 1A is a side view of a conventional rear screen projection display using three CRT light engines.
Figure 1B:
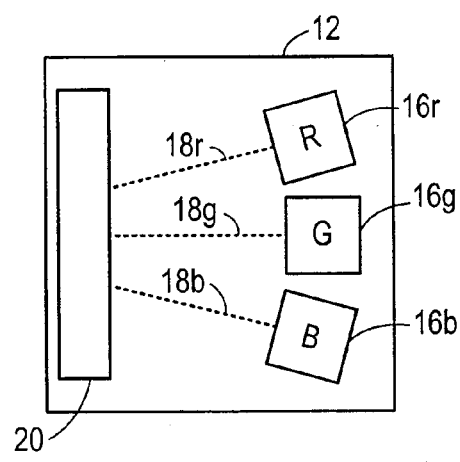
FIG. 1B is a top view of the lower portion of a conventional rear screen projection display using three CRT light engines.
Figure 2:
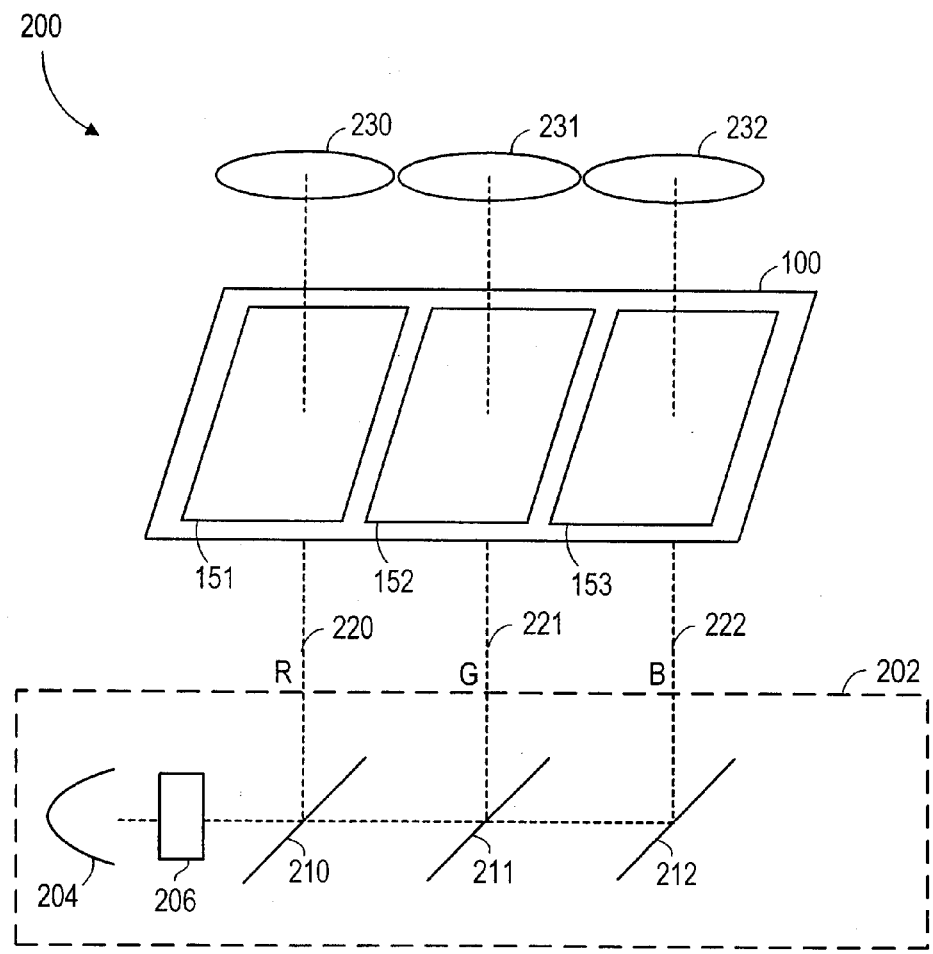
Figure 3:
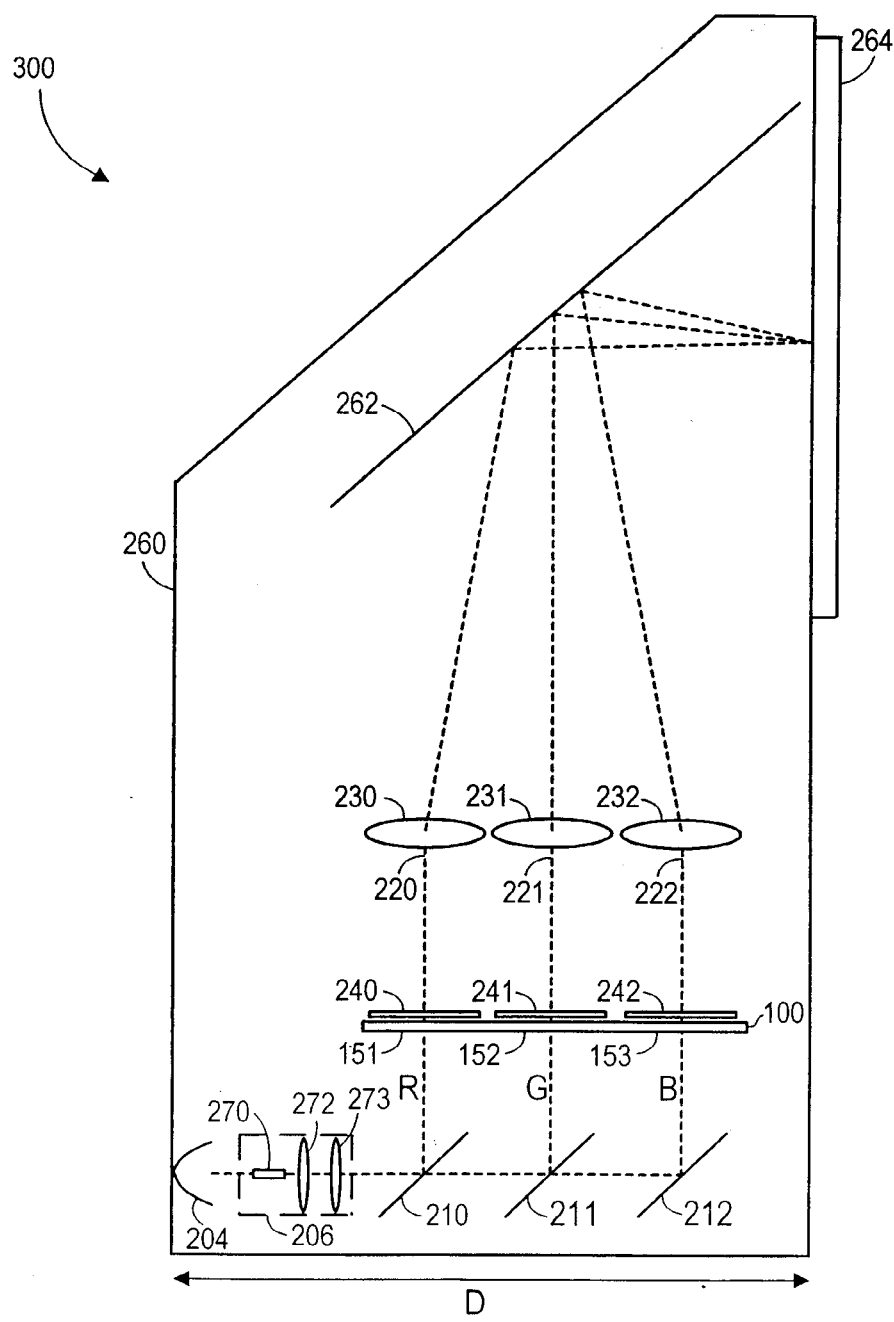
Figure 6:
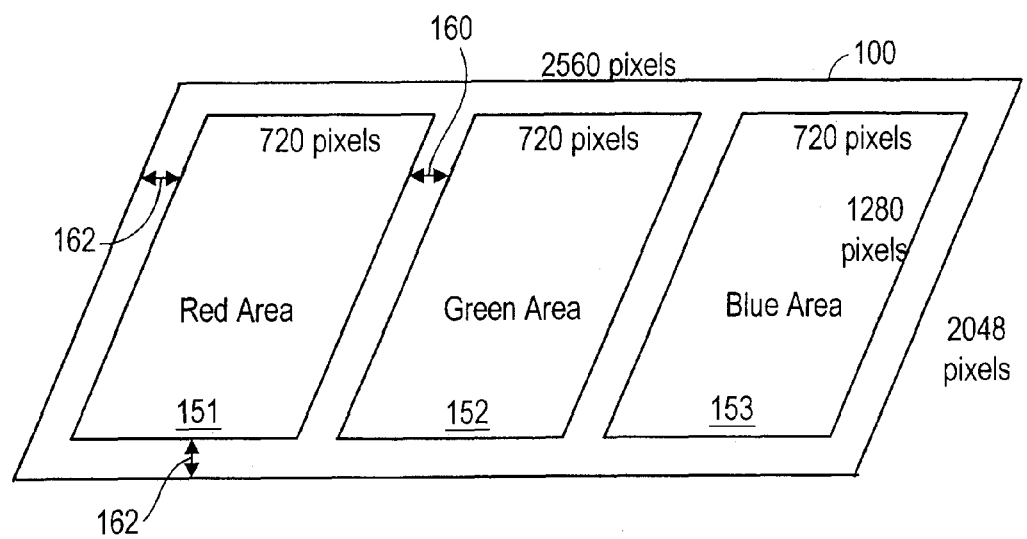
Figure 4A:
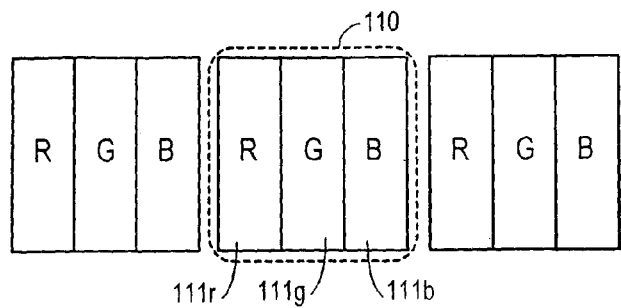
Figure 4B:
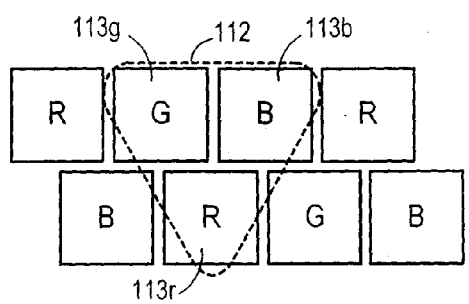
Figure 4C:
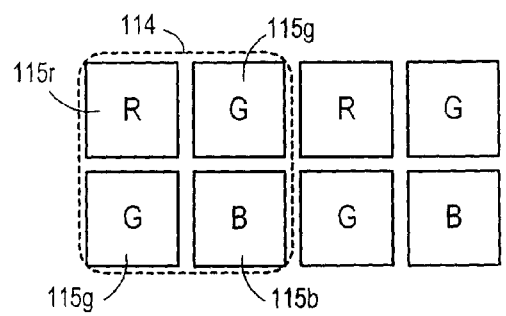
Figure 5:
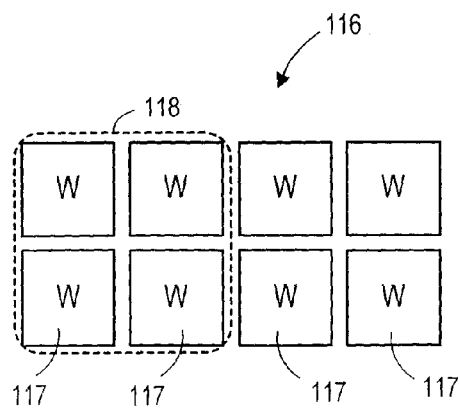

FIG. 6 shows an arrangement of three designated color image areas on a monochrome TFT panel in accordance with one embodiment of the present invention. As described above, monochrome TFT panel 100 is divided into three image areas of addressable pixels. Each image area is assigned for forming an image in a one primary color component of a full color image. In the present embodiment, image areas 151, 152 and 153 for receiving red, green and blue color light, respectively, are provided. Each image area modulates the respective color light according to image data for that color.

In the embodiment shown in FIG. 6, TFT panel 100 is 12 inches in width by 9.7 inches in height and has an addressable pixel resolution of 2048 by 2560 pixels. The panel can be adapted, for example, from a full color panel with a resolution of 1024 by 1280 (assuming a 0.24 mm color pixel pitch) and having the quad configuration of pixels as discussed above. The 2048 by 2560 sub-pixels of TFT panel 100 have a pixel pitch of 0.12 mm and are divided into three separate image areas, each image area having a resolution of 1280 by 720 pixels. The 1280 by 720 resolution is provided here to illustrate that monochrome TFT panel 100 can be used to provide high definition television (HDTV) resolution.

Referring to FIG. 6, when red image area 151, green image area 152 and blue image area 153, each having a size of 1280 by 720 pixels, are arranged as shown in TFT panel 100, excess pixels are left so that a perimeter 162 and spacing 160 between the image areas can be formed. In the present example, 400 excess pixels along the width and 768 excess pixels along the length of TFT panel 100 are available. Thus, spacing 160 of about 0.5 inch, for example, can be formed between each image area. The perimeter and spacing surrounding image areas 151–153 allow the projection system of the present invention to optimally position the illumination optics so that each image area can be properly illuminated by the respective color light.

In operation, each addressable pixel in red image area 151 of TFT panel 100 is individually addressed so as to modulate the colored light passing through that image area of TFT panel 100. The light that passes through red image area 151 is projected to form the red color component of a desired full color image. Similarly, the addressable pixels in green image area 152 and blue image area 153 of TFT panel 100 are also individually addressed so as to modulate the colored light passing through these image areas of TFT panel 100. The light passing through green image area 152 and blue image area 153 are projected to form the green color component and the blue color component, respectively, of the full color image.

TFT panel 100 is illustrated with an image area resolution of 1280 by 720 for HDTV format. In other embodiments, the image area resolution can be selected based on the desired application. Also, the size of perimeter 162 and the size of spacing 160 between the image areas can be varied or eliminated depending on the physical size of the addressable pixels, the TFT panel, and other design requirements such as the illumination optics. For example, it is expected that in any volume application, such as consumer television, the monochrome TFT panel will have color image areas that are optimally sized and optimally configured for the specific projection system. Factors such as the viewing screen size, desired resolution, light source, power dissipation and cost may be taken into account.

In an alternate embodiment, the projection system of the present invention includes a color TFT LCD panel where the color filter of the pixels are arranged in separate image areas as shown in FIG. 6. That is, the color TFT panel will include the respective color filters in each of the color image areas. For instance, red image area 151 will include red color filters while green image area 152 will include green color filters. Because only red color light will be sent through red image area 151, no transmission loss is realized due to the lower spatial resolution of a normally (i.e., conventionally) constructed color TFT panel. A projection system using a color TFT LCD panel constructed by separating the color pixels into separate areas can achieve three times the brightness level as a normally constructed TFT panels but only about one-half that of a monochrome TFT panel.

An important advantage of providing a monochrome TFT panel with three separate image areas is that the three image areas are precisely aligned to each other in the fabrication of the TFT panel. This eliminates the alignment steps that are necessary in three panel systems as well as obviating the need to ensure precise alignment over the life of the projector.

The use of a single monochrome TFT panel in the full color rear screen projection system of the present invention provides many advantages over conventional rear screen projection systems.

First, the projection system of the present invention can achieve a significant increase in total light transmission, resulting in a brighter image. In a full color TFT panel, light transmission through the color filters is typically only 4 to 6 percent. However, with the use of a monochrome TFT panel, light transmission can be increased to 25 to 35 percent. Most of the transmission loss in a monochrome panel is due to the input and output polarizers of the LCD panel which are about 38 to 42 percent transmissive to unpolarized light. Therefore, the projection system of the present invention can achieve a significant increase in transmission of light by using a monochrome TFT LCD panel.

Second, the projection system of the present invention can achieve higher image quality. Because the monochrome TFT panel used in the projection system of the present invention can have very high transmission, the projection system of the present invention does not require desaturation of the red color light for the purpose of improving transmission, as is commonly done in conventional projection systems. Therefore, the projection system of the present invention can display images with brighter and more vivid colors, resulting in a more pleasing image.

Third, the projection system of the present invention uses a single monochrome TFT panel, thereby eliminating the need to precisely align 3 separate panels in conventional 3-panel systems. The complexity of the projection system of the present invention is greatly reduced, minimizing the manufacturing cost and maintenance cost.

Finally, by using a relatively large TFT panel in the projection system of the present invention, the magnification required to project the image is reduced so that the optical system can be simplified and less expensive optical components can be used. The projection system of the present invention can achieve reduced size and reduced cost without sacrificing image quality.

The above detailed descriptions are provided to illustrate specific embodiments of the present invention and are not intended to be limiting. Numerous modifications and variations within the scope of the present invention are possible. For example, the precise arrangement of the size and shape of the pixels and separate color image areas in FIGS. 5 and 6 are for illustrative purposes only, and other arrangements are possible. Also, the number of lamps, mirrors, lenses, and their arrangement with respect to the TFT panel in FIGS. 2 and 3, are for illustrative purposes only, and different numbers and arrangements can be employed, as understood by one of ordinary skilled in the art. Furthermore, while the above descriptions described an exemplary TFT panel for HDTV resolution in a rear screen projection system, one of ordinary skill in the art would appreciate that the projection display system of the present invention can be applied in other applications with different resolution requirements. The present invention is defined by the appended claims.

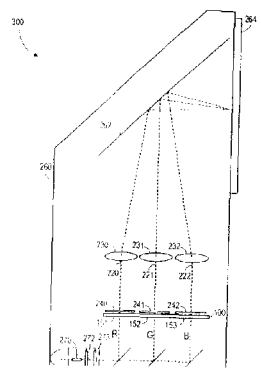

I claim:

1. An apparatus for projecting an image comprising:
   an illumination source generating a plurality of polarized light beams in three different primary colors;
   a monochrome liquid crystal display panel comprising a two-dimensional array of addressable pixels, the array of addressable pixels being divided into a plurality of image areas, each image area receiving one of the plurality of polarized light beams in a respective primary color and modulating the polarized light beam to generate an image in the respective primary color; and
   a projection lens assembly for aligning and projecting the images generated by the plurality of image areas of the liquid crystal display panel to form a full color image, wherein the projection lens assembly comprises:
   a first projection lens coupled to receive the image generated by a first one of the image areas;
   a second projection lens coupled to receive the image generated by a second one of the image areas; and
   a third projection lens coupled to receive the image generated by a third one of the image areas,
   wherein the second projection lens is positioned between the first and the third projection lenses, the first and the third projection lenses are positioned in an offset position relative to the respective first and third image areas.

2. The apparatus of claim 1, wherein the illumination source comprises:
   a light source emitting randomly polarized white light;
   a polarizing element coupled to receive the randomly polarized white light and generate a polarized white light beam; and
   color separating elements for separating the polarized white light beam into the plurality of polarized light beams in three different primary colors.

3. The apparatus of claim 2, wherein the polarizing element comprises:
   a tunnel integrator coupled to receive the randomly polarized white light, the tunnel integrator having an input end comprising an input aperture and a reflective inside surface coated with a quarter wave retarder and an output end; and
   a transmitting/reflecting polarizer coupled to the output end of the tunnel integrator for generating the polarized white light beam.

4. The apparatus of claim 3, wherein the light source comprises a lamp emitting randomly polarized white light and an elliptical reflector focusing the randomly polarized white light into the tunnel integrator.

5. The apparatus of claim 3, wherein the liquid crystal display panel comprises a liquid crystal module and control electrodes sandwiched between transparent glass plates, an input polarizer and an output polarizer.

6. The apparatus of claim 2, wherein the polarizing element comprises:
   a set of lens arrays coupled to receive and collimate the randomly polarized white light; and
   a polarizing converting system (PCS) plate comprising polarizing beam splitters for polarizing the randomly polarized white light.

7. The apparatus of claim 6, wherein the light source comprises a lamp emitting randomly polarized white light and a parabolic reflector focusing the randomly polarized white light onto the set of lens arrays.

8. The apparatus of claim 6, wherein the liquid crystal display panel comprises a liquid crystal module and control electrodes sandwiched between transparent glass plates, an input polarizer and an output polarizer.

9. The apparatus of claim 2, wherein the color separating elements comprise:
   a first color dichroic mirror for reflecting the polarized light beam in a first primary color and transmitting the polarized light beam not of the first primary color;
   a second color dichroic mirror coupled to receive the polarized light beam not of the first primary color, the second color dichroic mirror reflecting the polarized light beam in a second primary color and transmitting the polarized light beam not of the second primary color; and
   a mirror coupled to receive and reflect the polarized light beam not of the second primary color.

10. The apparatus of claim 2, wherein the color separating elements comprise a first, second and third color filters, each of the first, second and third color filters receiving the polarized white light beam and generating the polarized light beam in one of three primary colors.

11. The apparatus of claim 1, wherein the illumination source comprises:
- a plurality of light sources, each light source emitting randomly polarized white light;
- a plurality of polarizing elements, each polarizing element coupled to receive the randomly polarized white light from a respective one of the plurality light sources and generate a polarized white light beam; and
- a plurality of color filters, each color filter receiving one polarized white light beam and generating a polarized light beam in one of three primary colors.

12. The apparatus of claim 1, wherein the liquid crystal display panel is between 7 and 20 inches measured diagonally.

13. The apparatus of claim 1, wherein the number of the addressable pixels is 2560 by 2048.

14. The apparatus of claim 1, wherein the number of the addressable pixels is 2160 by 1280.

15. The apparatus of claim 1, wherein the monochrome liquid crystal display panel comprises a perimeter area and a plurality of spacing separating each of the image areas.

16. The apparatus of claim 15, wherein the perimeter area and the plurality of spacing are formed using a portion of the addressable pixels.

17. The apparatus of claim 1, wherein the first and the third projection lenses are positioned off-axis and the second projection lens is positioned on-axis.

18. The apparatus of claim 1, wherein the projection lens assembly further comprises: a plurality of Fresnel lenses coupled between the monochrome liquid crystal display panel and the projection lens assembly, each of the plurality of Fresnel lenses coupled to steer the image generated by one of the image areas to a respective one of the first, second and third projection lenses.

19. A rear screen projection system comprising:
- a light source emitting randomly polarized white light;
- a polarizing element coupled to receive the randomly polarized white light and generate a polarized white light beam;
- color separating elements for separating the polarized white light beam into a plurality of polarized light beams in at least three different primary colors;
- a monochrome liquid crystal display panel comprising a two-dimensional array of addressable pixels, the array of addressable pixels being divided into a plurality of image areas, each image area receiving one of the plurality of polarized light beams in a respective primary color and modulating the polarized light beam to generate an image in the respective primary color; and
- a projection lens assembly for aligning and projecting the images generated by the plurality of image areas of the liquid crystal display panel to form a full color image, wherein the projection lens assembly comprises:
  - a first projection lens coupled to receive the image generated by a first one of the image areas;
  - a second projection lens coupled to receive the image generated by a second one of the image areas; and
  - a third projection lens coupled to receive the image generated by a third one of the image areas,
  - wherein the second projection lens is positioned between the first and the third projection lenses, the first and the third projection lenses are positioned in an offset position relative to the second projection lens.

20. The rear screen projection system of claim 19, further comprising:
- one or more mirrors coupled to receive the images aligned and projected by the projection lens assembly and to reflect the images; and
- a viewing screen coupled to receive the reflected image from the mirror and to display the images and a single full color image.

21. The rear screen projection system of claim 19, wherein the polarizing element comprises:
- a tunnel integrator coupled to receive the randomly polarized white light, the tunnel integrator having an input end comprising an input aperture and a reflective inside surface coated with a quarter wave retarder and an output end; and
- a transmitting/reflecting polarizer coupled to the output end of the tunnel integrator for generating the polarized white light beam.

22. The rear screen projection system of claim 21, wherein the light source comprises a lamp emitting randomly polarized white light and an elliptical reflector focusing the randomly polarized white light into the tunnel integrator.

23. The rear screen projection system of claim 21, wherein the liquid crystal display panel comprises a liquid crystal module and control electrodes sandwiched between transparent glass plates, an input polarizer and an output polarizer.

24. The rear screen projection system of claim 19, wherein the polarizing element comprises:
- a set of lens arrays coupled to receive and collimate the randomly polarized white light; and
- a polarizing converting system (PCS) plate comprising polarizing beam splitters for polarizing the randomly polarized white light.

25. The rear screen projection system of claim 24, wherein the light source comprises a lamp emitting randomly polarized white light and a parabolic reflector focusing the randomly polarized white light onto the PCS plate.

26. The rear screen projection system of claim 24, wherein the liquid crystal display panel comprises a liquid crystal module and control electrodes sandwiched between transparent glass plates, an input polarizer and an output polarizer.

27. The rear screen projection system of claim 19, wherein the color separating elements comprise:
- a first color dichroic mirror for reflecting the polarized light beam in a first primary color and transmitting the polarized light beam not of the first primary color;
- a second color dichroic mirror coupled to receive the polarized light beam not of the first primary color, the second color dichroic mirror reflecting the polarized light beam in a second primary color and transmitting the polarized light beam not of the second primary color; and
- a mirror coupled to receive and reflect the polarized light beam not of the second primary color.

28. The rear screen projection system of claim 19, wherein the first and the third projection lenses are positioned off-axis and the second projection lens is positioned on-axis.

29. The rear screen projection system of claim 19, wherein the projection lens assembly further comprises: a plurality of Fresnel lenses coupled between the monochrome liquid crystal display panel and the projection lens assembly, each of the plurality of Fresnel lenses coupled to steer the image generated by one of the image areas to a respective one of the first, second and third projection lenses.

30. A method for projecting an image, comprising:

generating a plurality of polarized light beams in at least three different primary color components;

directing each of the plurality of polarized light beams at a respective image area of a monochrome liquid crystal display panel, each image area of the liquid crystal display panel modulating the polarized light beam according to image data corresponding to the respective color designated for the image area; and projecting the plurality of modulated light beams in at least three different primary color components to form a full color display image;

wherein the projecting comprises offsetting a projected position of one or more of the plurality of modulated light beams so that the plurality of modulated light beams overlay each other.

31. The method of claim 30, wherein generating a plurality of polarized light beams comprises:

providing a source of randomly polarized white light;

polarizing the randomly polarized white light; and separating the polarized white light into at least three primary color components.

32. The method of claim 30, wherein the projecting further comprises steering the plurality of modulated light beams to the projected positions using Fresnel lenses.

33. The method of claim 30, wherein the offsetting a projected position of one or more of the plurality of modulated light beams comprises projecting a first one of the plurality of modulated light beams to an on-axis position and projecting a second one and a third one of the plurality of modulated light beams to an off-axis position, the first one of the modulated light beams being positioned between the second one and the third one of the modulated light beams.

34. An apparatus for projecting an image comprising:

an illumination source generating a plurality of polarized light beams in three different primary colors;

a monochrome liquid crystal display panel comprising a two-dimensional array of addressable pixels, the array of addressable pixels being divided into a plurality of image areas, each image area receiving one of the plurality of polarized light beams in a respective primary color and modulating the polarized light beam to generate an image in the respective primary color; and a projection lens assembly for aligning and projecting the images generated by the plurality of image areas of the liquid crystal display panel to form a full color image, wherein the illumination source comprises:

a light source emitting randomly polarized white light;

a polarizing element coupled to receive the randomly polarized white light and generate a polarized white light beam; and color separating elements for separating the polarized white light beam into the plurality of polarized light beams in three different primary colors; and wherein the polarizing element comprises:

a tunnel integrator coupled to receive the randomly polarized white light, the tunnel integrator having an input end comprising an input aperture and a reflective inside surface coated with a quarter wave retarder and an output end; and a transmitting/reflecting polarizer coupled to the output end of the tunnel integrator for generating the polarized white light beam.

35. A rear screen projection system comprising:

a light source emitting randomly polarized white light;

a polarizing element coupled to receive the randomly polarized white light and generate a polarized white light beam;

color separating elements for separating the polarized white light beam into a plurality of polarized light beams in at least three different primary colors;

a monochrome liquid crystal display panel comprising a two-dimensional array of addressable pixels, the array of addressable pixels being divided into a plurality of image areas, each image area receiving one of the plurality of polarized light beams in a respective primary color and modulating the polarized light beam to generate an image in the respective primary color; and a projection lens assembly for aligning and projecting the images generated by the plurality of image areas of the liquid crystal display panel to form a full color image, wherein the polarizing element comprises:

a tunnel integrator coupled to receive the randomly polarized white light, the tunnel integrator having an input end comprising an input aperture and a reflective inside surface coated with a quarter wave retarder and an output end; and a transmitting/reflecting polarizer coupled to the output end of the tunnel integrator for generating the polarized white light beam.

36. An apparatus for projecting an image comprising:

an illumination source generating a plurality of polarized light beams in at least three different primary colors;

a liquid crystal display panel comprising a two-dimensional array of addressable pixels, the array of addressable pixels being divided into a plurality of color image areas, each color image area in a respective one of the at least three primary colors, each color image area receiving a polarized light beams in the respective primary color and modulating the polarized light beam to generate an image in the respective primary color; and a projection lens assembly for aligning and projecting the images generated by the plurality of image areas of the liquid crystal display panel to form a full color image, wherein the projection lens assembly comprises:

a first projection lens coupled to receive the image generated by a first one of the color image areas;

a second projection lens coupled to receive the image generated by a second one of the color image areas; and a third projection lens coupled to receive the image generated by a third one of the color image areas, wherein the second projection lens is positioned between the first and the third projection lenses, the first and the third projection lenses are positioned in an offset position relative to the respective first and third color image areas.

37. The apparatus of claim 36, wherein the illumination source comprises:

a light source emitting randomly polarized white light;

a polarizing element coupled to receive the randomly polarized white light and generate a polarized white light beam; and color separating elements for separating the polarized white light beam into the plurality of polarized light beams in at least three different primary colors.

* * * * *

UNITED STATES PATENT AND TRADEMARK OFFICE
CERTIFICATE OF CORRECTION

PATENT NO.     : 6,637,888 B1
DATED          : October 28, 2003
INVENTOR(S)    : Thomas J. Haven It is certified that error appears in the above-identified patent and that said Letters Patent is hereby corrected as shown below:

The title page showing the illustrative figure should be replaced with the attached title page.

<u>Drawings,</u>
Replace Sheets 1,2,3,4 and 5 (informal drawings) with replacement Sheets 1,2,3,4 and 5 (formal drawings).

Signed and Sealed this

Twentieth Day of April, 2004

JON W. DUDAS
*Acting Director of the United States Patent and Trademark Office*

(12) United States Patent
Haven

(10) Patent No.: US 6,637,888 B1
(45) Date of Patent: Oct. 28, 2003

(54) FULL COLOR REAR SCREEN PROJECTION SYSTEM USING A SINGLE MONOCHROME TFT LCD PANEL

(75) Inventor: Thomas J. Haven, Portland, OR (US)

(73) Assignee: Delta Electronics, Inc., Taipei (TW)

(*) Notice: Subject to any disclaimer, the term of this patent is extended or adjusted under 35 U.S.C. 154(b) by 0 days.

(21) Appl. No.: 10/057,132

(22) Filed: Jan. 24, 2002

(51) Int. Cl.$^7$ .............................................. G03B 21/14
(52) U.S. Cl. .......................................... 353/31; 353/94
(58) Field of Search .......................... 353/20, 31, 34, 353/37, 94, 101; 349/5, 7, 8; 359/487, 494, 495, 497, 500; 348/771

(56) References Cited

U.S. PATENT DOCUMENTS

| | | | |
|---|---|---|---|
| 4,864,390 A | 9/1989 | McKechnie et al. | 358/60 |
| 5,012,274 A | 4/1991 | Dolgoff | 340/702 |
| 5,161,042 A | 11/1992 | Hamada | 359/41 |
| 5,185,712 A * | 2/1993 | Sato et al. | 348/333.08 |
| 5,241,407 A | 8/1993 | Sonehara et al. | 359/40 |
| 5,608,467 A | 3/1997 | Janssen et al. | 348/744 |
| 5,767,924 A * | 6/1998 | Hiroki et al. | 349/5 |
| 5,786,934 A | 7/1998 | Chiu et al. | 359/494 |
| 5,805,244 A | 9/1998 | Suh | 349/7 |
| 5,845,981 A * | 12/1998 | Bradley | 353/31 |
| 5,865,521 A * | 2/1999 | Hashizume et al. | 353/38 |
| 5,880,889 A | 3/1999 | Neumann et al. | 359/634 |
| 5,897,190 A * | 4/1999 | Takahashi | 353/31 |
| 5,900,982 A | 5/1999 | Dolgoff et al. | 359/619 |
| 6,053,615 A * | 4/2000 | Peterson et al. | 353/20 |
| 6,097,546 A | 8/2000 | Yoshii et al. | 359/649 |
| 6,137,547 A | 10/2000 | Iijima et al. | 348/789 |
| 6,276,802 B1 | 8/2001 | Naito | 353/74 |
| 6,334,685 B1 * | 1/2002 | Slobodin | 353/31 |
| 6,457,833 B1 * | 10/2002 | Ishikawa et al. | 353/99 |
| 2002/0051112 A1 | 5/2002 | Katsura | 349/153 |

OTHER PUBLICATIONS

"Single–Panel Liquid Crystal Optical Engine for Rear Projectors", Sony publication DS002AKA, 10,1997, 16 pages.
"High Luminance, High Image Quality, and High Resolution Achieved in Single–Panel LCD Panels Single–Panel Color Projection TV LCDs, LCX011AM, LCX019AM", 2 pages.
J. Fuhrmann, et al., "28:2: Enhancement of the Light Efficiency of LC Projection Systems by the Use of Dichroic Color Filters," (1997) SID Digest, pp. 761–764.
H. Kanayama, et al., 15.1: A New LC Rear–Projection Display Based on the "Color–Grating Method," (1998) SID Digest, pp. 199–202.
E. Stupp, et al., Book Name: "Emissive Projection Systems," (1998) John Wiloyx Son, Ltd., pp. 201–207.

* cited by examiner

Primary Examiner—William Dowling
(74) Attorney, Agent, or Firm—Patent Law Group LLP; Carmen C. Cook

(57) ABSTRACT

A rear screen projection system uses a single monochrome liquid crystal display (LCD) panel for displaying full color images. In one embodiment, an apparatus for projecting an image includes an illumination source generating polarized light beams in three different primary colors, a monochrome liquid crystal display panel including a two-dimensional array of addressable pixels, the array of addressable pixels is divided into multiple image areas, and a projection lens assembly for aligning and projecting the images generated by the multiple image areas of the liquid crystal display panel to form a full color image. In one embodiment, the illumination source includes a light source emitting randomly polarized white light, a polarizing element coupled to receive the randomly polarized white light and generate a polarized white light beam, and color separating elements for separating the polarized white light beam into the polarized light beams in three different primary colors.

37 Claims, 5 Drawing Sheets